United States Patent [19]

Langlois

[11] Patent Number: 4,983,336
[45] Date of Patent: Jan. 8, 1991

[54] METHOD OF CONTROLLING THE AFTERPRESSURE VARIATION WITH TIME OF AN INJECTION-MOULDING MACHINE

[75] Inventor: Jacques A. E. Langlois, Vellmar, Fed. Rep. of Germany

[73] Assignee: U.S. Philips Corporation, New York, N.Y.

[21] Appl. No.: 462,992

[22] Filed: Jan. 5, 1990

Related U.S. Application Data

[63] Continuation of Ser. No. 263,096, Oct. 26, 1988, abandoned.

[30] Foreign Application Priority Data

Nov. 7, 1987 [DE] Fed. Rep. of Germany ....... 3737959

[51] Int. Cl.$^5$ .............................................. B29C 45/77
[52] U.S. Cl. ................................. 264/40.5; 264/40.6; 364/476; 425/145; 425/149; 425/159; 425/166
[58] Field of Search .............. 364/476; 264/40.1, 40.5, 264/40.6, 40.7, 328.1; 425/135, 155, 159, 162, 166, 145, 149

[56] References Cited

U.S. PATENT DOCUMENTS 4,695,237  9/1987  Inaba ................................. 425/135

Primary Examiner—Jill L. Heitbrink
Attorney, Agent, or Firm—Norman N. Spain

[57] ABSTRACT

A method controlling the afterpressure variation with time of an injection-moulding machine. A process computer controlling a hydraulic pressure drive of the injection-moulding machine stores a given reference afterpressure variation with time. Upon a variation of the moulding mass temperature Tm and/or of the tool temperature Tf, a new afterpressure variation with time is calculated. The time data samples corresponding to the reference temperature values and the reference afterpressure values, respectively, are then determined.

1 Claim, 3 Drawing Sheets

METHOD OF CONTROLLING THE AFTERPRESSURE VARIATION WITH TIME OF AN INJECTION-MOULDING MACHINE

This is a continuation of application Ser. No. 263,096, filed Oct. 26, 1988, now abandoned.

BACKGROUND OF THE INVENTION

The invention relates to a method of controlling the afterpressure variation with time of an injection-moulding machine comprising a plastification and moulding unit, which has a worm operated by a hydraulic pressure drive for transporting the plastified moulding mass into an injection nozzle, and a moulding tool arranged before the injection nozzle for producing a moulding, as well as a process computer which controls the hydraulic pressure drive, which stores a given selectable reference after-pressure variation with time and calculates the temperature values associated therewith and which calculates a new afterpressure variation with time upon variation of a moulding mass temperature Tm measured before the injection nozzle and/or of the tool temperature Tf measured in the moulding tool.

During injection-moulding, the pulverulent or granulated moulding mass is plastified by heating with the aid of a heating means arranged at the worm housing and is pressed during the mould filling stage (mould filling time) into the moulding tool by axial displacement of the worm in the direction of the injection nozzle. When the moulding tool has been completely filled with the moulding mass, the latter is solidified by cooling. After the mould filling stage, the afterpressure stage begins (after-pressure time), in which the pressure produced by the hydraulic pressure drive decreases continuously to the normal pressure. As far as possible, during this stage, no moulding mass will then flow out of the tool and into the tool, respectively. After the afterpressure stage, the demoulding stage begins (demoulding time), in which the tool is opened and the moulding is ejected. At the same time, the worm is moved away from the injection nozzle.

The method mentioned in the opening paragraph of controlling the afterpressure variation with time of an inject on-moulding machine is known from the publication "Prozessrechnereinsatz beim Spritzgiessen" by Dr. Ing. Matzke in "Technischwissenschaftlicher Bericht des Instituts für Kunststoffverarbeitung an der Rheinisch-Westfälischen Technischen Hochschule Aachen". This method, which is designated as PVT optimization, avoids material movements during the afterpressure stage. The afterpressure time is then calculated for given nominal value of the specific volume at the normal pressure (1 bar). The calculation of the afterpressure time takes place by means of a simplified formula derived from the well known heat conduction equation. The calculated afterpressure time is subdivided into equidistant time sections. Subsequently, at each time data sample the corresponding temperature value is calculated. The afterpressure time can then be determined from a formula establishing a relationship between the specific volume, the pressure and the temperature in the moulding. The calculated temperature and pressure values apply to a given moulding mass temperature and a given tool temperature.

When the moulding mass temperature and/or the tool temperature are varied, a new afterpressure time is calculated. Subsequently, this afterpressure time is subdivided into equidistant time sections and at each time data sample a new temperature value is determined. A new pressure value can then be calculated. The known method comprises a large number of calculation steps so that with the use of a process computer commercially available, when the temperature of the moulding mass or of the tool is varied, an afterpressure variation can be effected not during the proceeding or the next injection-moulding cycle, but only during the nextsubsequent injection-moulding cycle.

SUMMARY OF THE INVENTION

Therefore, the invention has for its object to provide a method of controlling the afterpressure variation with time of an injection-moulding machine, in which a new afterpressure variation with time is effected with the use of a commercially available process computer for the proceeding or next injection-moulding cycle.

In a method of the kind mentioned in the opening paragraph, this object is achieved by including steps in which the reference temperature values associated with the reference after-pressure variation with time are calculated by means of the equation $$Ti = Tf + (Tm - Tf) * F(m, a * tn * i/n)$$

where
m represents the center of a typical standardized moulding in the moulding tool,
a represents the thermal conductance of the moulding mass, tn represents the afterpressure time,
n represents the number of time data samples in the after-pressure variation with time,
i represents the instantaneous time data sample, and
F represents the standardized temperature function, whose values are calculated by use of the heat conduction equation and are stored in a first storage table of the process computer, and in that upon a variation of the tool temperature Tf and/or of the moulding mass temperature Tm the time data samples corresponding to the reference temperature values and reference afterpressure values, respectively, are calculated via the equation $$ti = \frac{1}{a} * F^{-1} \left[ \frac{Ti - Tf}{Tm - Tf} \right]$$

for obtaining a new afterpressure variation with time, where $F^{-1}$ is stored as an inverse function of the function F in a second storage table.

DETAILED DESCRIPTION OF THE INVENTION

Figure 1:
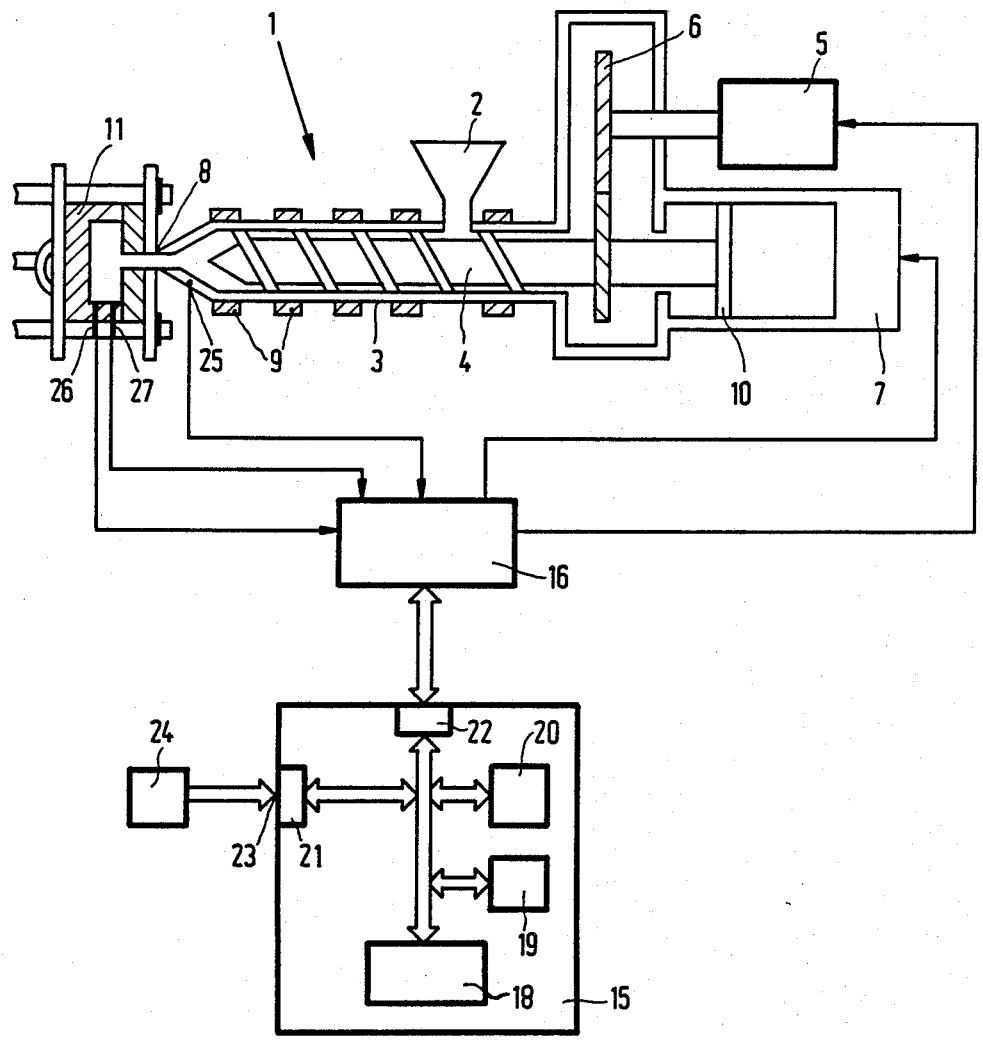
FIG. 1 is a diagrammatic view of an injection molding machine provided with a control device and a process computer in accordance with the invention.

The cooling process in the moulding at the after-pressure stage can be determined by means of the heat conduction equation. It determines the overall behaviour in space and in time of a temperature distribution if the boundary conditions, i.e. the heat transition conditions at the edge of the moulding, are given. The heat conduction equation is as follows:

$$a * \Delta T(x,y,z,t) = \frac{\delta T(x,y,z,t)}{t} \tag{1}$$

where the abbreviation for the Laplace operator means:

$$\Delta = \frac{\delta^2}{\delta x^2} + \frac{\delta^2}{\delta y^2} + \frac{\delta^2}{\delta z^2} \tag{2}$$

and the constant a is designated as thermal conductance value and x, y, z characterize the dependence in space and t characterizes the dependence in time.

The moulding mass present before injection-moulding in front of the nozzle approximately has a homogeneous temperature, that is to say it is isothermic. Therefore, there can be formulated as initial condition:

$$T(x,y,z,0) = Tm0 \tag{3}$$

that is to say that the moulding mass temperature at the beginning of the injection-moulding process is equal to the temperature Tm0. As a boundary condition there can be indicated:

$$T(r,t) = Tf0 \tag{4}$$

It is then assumed that the tool temperature Tf is essentially constant in time and isothermic, that is to say that the temperature Tf0 prevails during the whole cooling process at the edge r of the moulding.

A resolution of the heat conduction equation can be determined only for simple geometries of the moulding. For more complicated mouldings, such a simple (typical) geometry of the moulding is also used as the basis of the temperature calculation. With these simple mouldings, the spatial dependence is related to one coordinate (x).

As a resolution of the heat conduction equation (1) the equation $$T = Tf0 + (Tm0 - Tf0) * F\left(\frac{x}{r}, \frac{a*t}{r^2}\right) \tag{5}$$

is obtained, where the function F is the standardized temperature function of the standardized heat conduction equation $$\Delta F = \frac{\delta F}{\delta t} \tag{6}$$

with the initial condition $$F(x,0) = 1 \tag{7}$$

and with the boundary condition $$F(1,t) = 0 \tag{8}$$

During the standardization, the temperature gradient between Tm0 and Tf0 is defined as a temperature gradient between 1° C. and 0° C.

If the typical moulding is a plate with the standard thickness 2, the solution can be indicated as follows:

$$F(x,t) = \frac{4}{\pi} \sum_{k=0}^{\infty} \exp\left\{-\left[(2k+1)\frac{\pi}{2}\right]^2 t\right\} \frac{(-1)^k}{2k+1} \cos(2k+1)\frac{\pi x}{2}. \tag{9}$$

For a cylinder with the standard radius 1 there is obtained:

$$F(x,t) = 2 \sum_{k=1}^{\infty} \frac{J_0(R_k x)}{R_k J_1(R)} \exp\{-R_k^2 * t\}, \tag{10}$$

where $J_0$ is the Bessel function of the order zero and $J_1$ is the Bessel function of the first order and it holds for each $R_k$ that:

$$J_0(R_k) = 0.$$

$R_k$ can be determined from the last-mentioned equation. For a sphere with the standard radius 1 there is obtained:

$$F(x,t) = 2 \sum_{k=1}^{\infty} (-1)^{k+1} * \frac{\sin k\pi x}{k\pi x} * \exp\{-[k\pi]^2 * t\} \tag{11}$$

For calculation of the temperature at the center m of a typical moulding, the coordinate x must be made equal to 0.

If the moulding to be injection-moulded consists not only of a typical moulding, a typical moulding must be the, which forms part of this moulding to be injection-moulded and whose realization during injection-moulding is most difficult must be used for calculation. For each of the three moulding geometries calculated above in fact a different temperature variation with time is obtained.

The values of the function F(x,t) for the respective moulding, i.e. the dependence of the temperature on time, are stored in a first storage table of the process computer. As a result, with the calculation of a temperature sample (temperature Ti at the instant ti=Tn*i/n) the function F is no longer calculated via the equation $$Ti = Tf + (Tm - Tf) * F(m, a*tn*i/n) \tag{12}$$

but the corresponding function value is taken from the table.

Consequently, the temperature is calculated very rapidly.

Before the actual beginning of the production of the injection-moulded parts, a given optimum afterpressure variation with time is adjusted by the operator of the injection-moulding machine either by testing or by a calculation for a given tool temperature Tf and moulding mass temperature Tm. The process computer determines from this afterpressure variation with time the corresponding temperature variation with time.

If before the beginning or during an after-pressure stage it is found that the tool temperature Tf and/or the moulding mass temperature Tm have changed, a new afterpressure variation with time has to be determined. For this purpose, for each temperature sample determined upon the afterpressure variation with time data sample ti is calculated via the equation $$ti = \frac{1}{a} \cdot F^{-1}\left[\frac{Ti - Tf}{Tm - Tf}\right] \quad (13)$$

where $F^{-1}$ is the inverse function of the function F. This inverse function $F^{-1}$ has also been calculated for the typical mouldings and is stored in a second storage table in the process computer. After the calculation of the new time variations, the injection-moulding machine is controlled by the new afterpressure variation with time.

By means of the method according to the invention, upon variation of the tool temperature and/or the moulding mass temperature a new afterpressure variation with time is calculated immediately. This afterpressure variation with time is immediately taken over in the injection cycle as a new afterpressure variation with time. Since no extensive calculations are carried out, a commercially available process computer with a clock rate of, for example, 3 MHz can be used for the calculation of the afterpressure variation with time.

An embodiment of the invention will now be described more fully with reference to the drawings.

The injection-moulding machine 1 shown diagrammatically in FIG. 1 has a funnel 2, through which plastic granulate can be fed into a worm housing 3. The worm housing comprises a worm 4 which is rotatably and axially displaceably journalled. The rotary movement of the worm 4 is obtained by means of a drive gear 6 and a motor 5. The axial displacement of the worm 4 is obtained by means of a hydraulic pressure drive 7, which exerts a pressure on a piston 10 arranged at the end of the worm 4. The other end of the worm 4 points to an injection nozzle 8. Outside the worm housing 3, heating members 9 are further arranged, which heat the plastic granulate in order to obtain a plastified moulding mass.

A moulding tool 11 is arranged before the injection nozzle 8, tool 11. The moulding tool 11 is pressed against the injection nozzle 8 by means of a pressure device not shown here further and which detaches, after termination of the injection-moulding process the moulding tool 11 from the injection nozzle 8 and ejects the solidified moulding after termination of the injection-moulding process. By means of a process computer 15 and a control device 16 controlled by the process computer 15, the pressures for the axial movement of the worm 4 and for the moulding tool 11 are produced. The control device 16 also controls the speed of rotation of the motor 5 and further quantities not described here further, such as, for example, the temperature of the heating bodies 9.

The process computer 15 comprises a central calculation unit 18, for example a microprocessor, at least one write/read memory 19 (RAM), at least one read-only memory 20 (ROM), an input element 21 and an output element 22. The process computer may also be connected to further external memory circuits, for example, a CD-ROM drive. The input 23 of the input element 21 is connected to an input device 24, into which are fed the parameters for the injection-moulding machine desired by the operator. The central calculation unit 18 is connected to the individual elements, i.e. the write/read memory 19, the read-only memory 20 and the input and output elements 21 and 22 through control leads, data leads and address leads. In the read-only memory there is stored a programm, which is carried out by the central calculation unit 18. In the write/read memory 19 variable data are stored during the calculation process. Through the output element 22 data for the control device 16 are supplied, which control device produces the required pressures, for example for the hydraulic pressure drive 7.

In the control device 16 there is also arranged a measuring-value sensing device, which is connected at least to two temperature sensors 25 and 26 and at least one pressure sensor 27. The temperature sensor 25 measures the moulding mass temperature Tm before the injection nozzle 8; the temperature sensor 26, which is arranged in the tool 11, measures the tool temperature Tf and the pressure sensor 27 measures the pressure prevailing in the interior of the tool. The signals produced by the sensors 25 to 27 are received in the measuring-value sensing device and are supplied through the output element 22 to the process computer 15.

An injection-moulding cycle can be subdivided into the mould filling stage, the afterpressure stage, the demoulding stage and the ejection stage. During the mould filling stage, the plastified moulding mass is pressed out of the injection nozzle 8 into the tool 11. When the tool 11 has been completely filled, that is to say that a given pressure prevails in the tool 11, the afterpressure stage begins. During the afterpressure stage, the pressure is continuously reduced. At the end of the afterpressure stage, the normal pressure (1 bar) prevails. During the following demoulding stage, the moulding is cooled to a given temperature and at the subsequent ejection stage it is ejected out of the tool. During the ejection stage, the worm 4 has also moved away from the injection nozzle 8. At the end of the injection stage a new injection moulding cycle and hence a new mould filling process begins.

During the afterpressure stage, the pressure is to be controlled so that no supply or discharge of moulding mass takes place between the tool 11 and the injection nozzle 8. When in fact such a flowing of the moulding mass takes place, undesired orientations are obtained in the interior of the moulding. In order to avoid that upon a change of the moulding mass temperature Tm and/or of the tool temperature Tf a supply or discharge of the moulding mass takes place, the afterpressure variation with time is controlled by means of the method described below.

Figure 2:
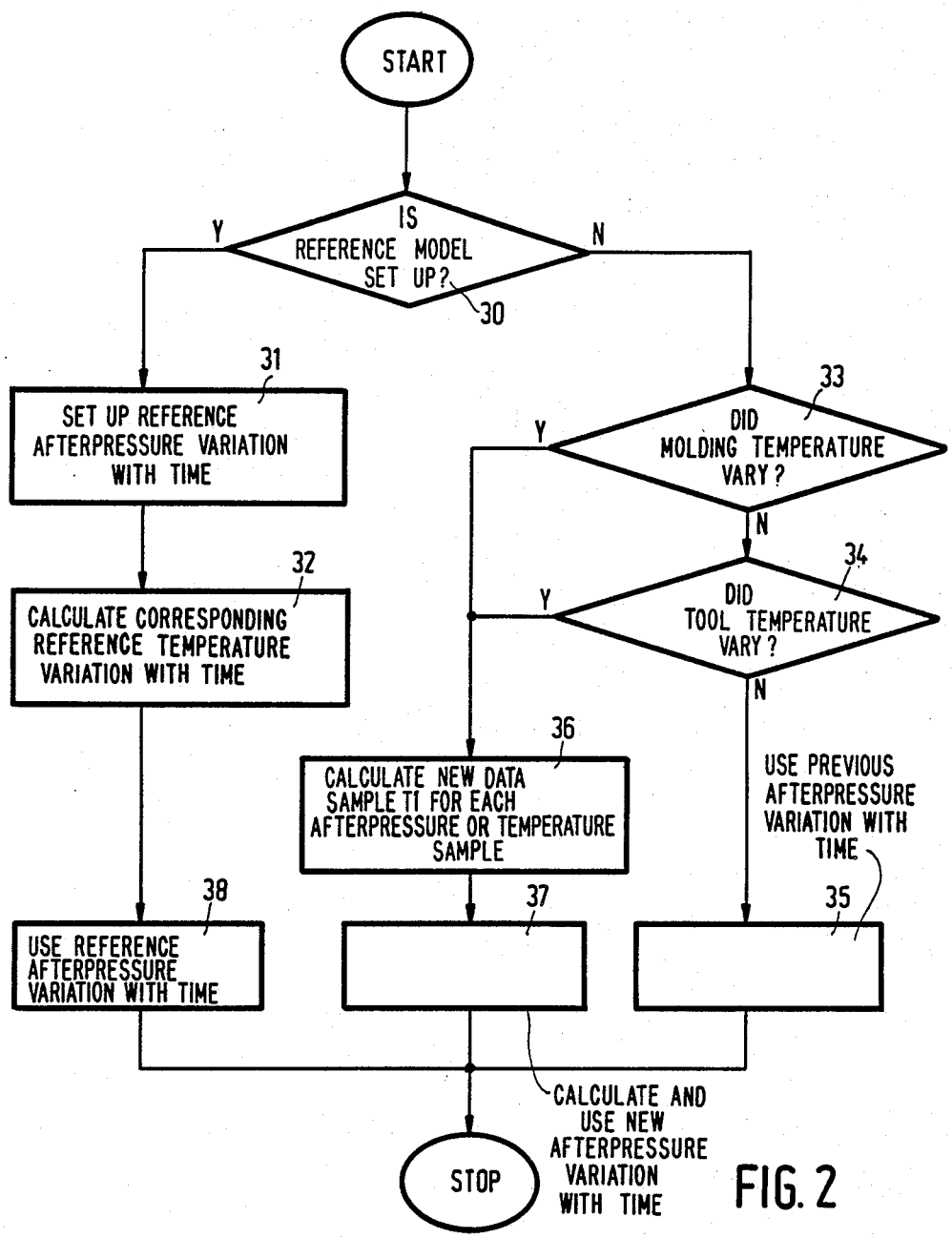
FIG. 2 is a flow chart showing the separate processing steps carried out by the process computer.

FIG. 2 shows a flow chart, by means of which the individual processing steps which lead to producing an afterpressure variation with time, are explained. The flow chart represents the processing steps for calculating the afterpressure during an injection cycle. At the beginning (START) of the injection-moulding process, the operator of the injection-moulding machine sets up a reference afterpressure variation with time (block 30). The operator then each time supplies the typical moulding, for example a plate, and its geometries through the input device 24. From this reference afterpressure variation with time (block 31), which represents the afterpressure as a function of time, a corresponding reference temperature variation with time is calculated (block 32) by means of the equation (12). The values of the function F are stored in a table in the read-only memory 20. At a given time data sample, therefore a corresponding afterpressure sample and a corresponding temperature sample are obtained. In accordance with this reference afterpressure variation with time, the injection-moulding machine is operated (block 38).

If now the moulding mass temperature Tm and/or the tool temperature Tf are varied, a new afterpressure variation with time must be calculated. In accordance with the flow chart in FIG. 2, there is first interrogated, as is represented in the block 33, whether a variation of the moulding mass temperature has taken place. This comparison is carried out before the beginning of the afterpressure stage. If this is not the case, there is interrogated, as represented in the block 34, whether a variation of the tool temperature has taken place. If this is not the case either, the afterpressure variation with time used in the preceding injection cycle is used. However, if a variation of the moulding mass temperature or of the tool temperature has taken place, according to the equation (13) a new time data sample ti is calculated (block 36) at each afterpressure sample or temperature sample. The values of the function $F^{-1}$ are also stored in the read-only memory 20. After calculation of the new afterpressure variation with time, the new afterpressure variation with time is used (block 37). There can also be proceeded so that the occurring afterpressure variation with time is calculated anew and varied upon a temperature variation.

Figure 3:
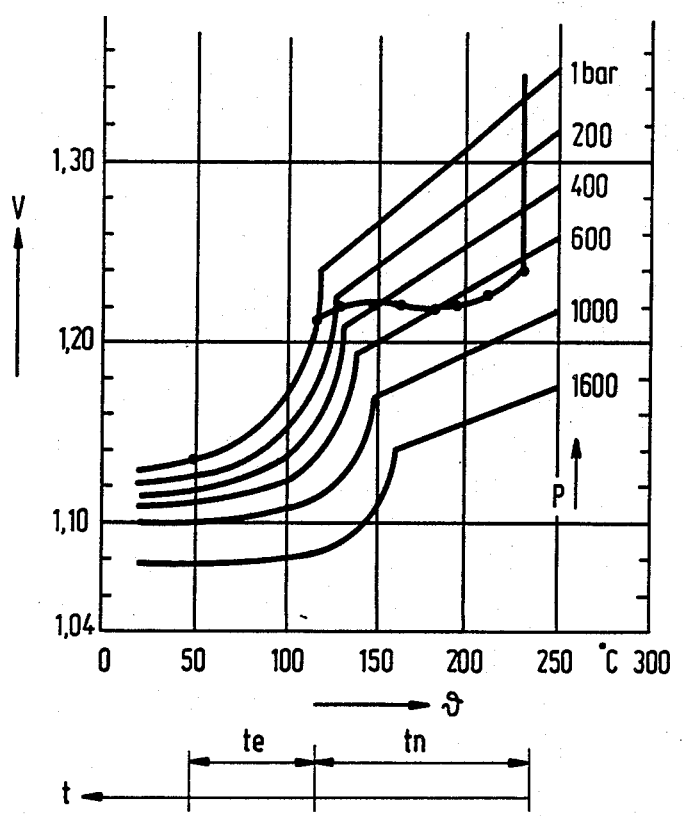
FIG. 3 is a graph showing the variations of pressure, specific volume and temperature with time in the interior of the tool for a given molding.

FIG. 3 shows the time variation in the interior of the tool for a given moulding, which consists of the material polypropylene. In this Figure, p, V and υ are pressure, specific volume and temperature, respectively. During the injection stage, at a temperature υ of about 230° C. the pressure p in the tool is increased abruptly from 1 bar to about 700 bar. During the afterpressure stage (afterpressure time tn), the pressure is slowly reduced to 1 bar and the temperature of the moulding is decreased at the same time to about 120° C. At the subsequent demoulding stage (demoulding time te), the moulding is cooled to about 50° C., a shrinkage of the moulding then occurring.

What is claimed is:

1. A method of controlling variations of the afterpressure with time of an injection-molding machine comprising a plastification unit for providing a plastified molding mass, a molding injection unit comprising a worm operated by a hydraulic pressure drive for transporting said plastified molding mass into an injection nozzle, a molding tool for producing a molding, said molding tool contacting said injection nozzle and a process computer coupled to said hydraulic pressure drive, for controlling the movement of said hydraulic pressure drive, for storing a value of a given selectable reference variation of the afterpressure with time, for calculating and storing temperature values associated with said reference variations of the afterpressure with time, for calculating a new variation of the afterpressure with time upon variation of at least one of said molding mass temperature Tm and said tool temperature Tf measured in the molding tool, said computer comprising at least a first memory unit, a second memory unit, an input element, an output element and a calculating unit comprising storing in said first memory unit the values:

m, where m represents the temperature of the center of a typical standardized molding in the molding tool, a, where a represents the thermal conductance of the molding mass, n, where n represents the number of time data samples in the afterpressure variations with time, i, where i represents the instantaneous time data sample, F where F represents the standardized heat function calculated from a standard heat conduction equation $$a*\Delta T(x,y,z,t) = \delta T(x,y,z,t)/t,$$

entering into said calculating unit at least one of Tm, where Tm represents the temperature of the molding mass, measured before the injection nozzle, and Tf, where Tf represents the tool temperature measured in the molding tool, calculating in said calculating unit, by means of the equation $$Ti = Tf + (Tm - Tf)*F(m, a*tn*i/n)$$

the value of Ti, where Ti represents the reference temperature values associated with the reference variation of the afterpressure with time, storing in said second memory unit the value of $F^{-1}$, where $F^{-1}$ is an inverse function of the function F, calculating in said calculating unit the value of ti, where ti represents the afterpressure variation with time of the afterpressure data samples corresponding to the reference temperature values and the reference afterpressure values by means of the equation $$ti = \frac{1}{a} * F^{-1}\left[\frac{Ti - Tf}{Tm - Tf}\right]$$

and automatically controlling the movement of said hydraulic pressure drive in accordance with the value of ti.

* * * * *